(12) United States Patent
Stoffels (10) Patent No.: US 7,040,636 B2
(45) Date of Patent: May 9, 2006

(54) CART TO FACILITATE COLLECTION, STORAGE AND DISTRIBUTION OF FOLDING WARNING LINES

(75) Inventor: Richard B. Stoffels, Eden Prairie, MN (US)

(73) Assignee: Garlock Equipment Company, Minneapolis, MN (US)

( * ) Notice: Subject to any disclaimer, the term of this patent is extended or adjusted under 35 U.S.C. 154(b) by 243 days.

(21) Appl. No.: 10/714,280

(22) Filed: Nov. 14, 2003

(65) Prior Publication Data

US 2005/0104309 A1    May 19, 2005

(51) Int. Cl.
*B62B 1/26* (2006.01)
(52) U.S. Cl. .................... 280/47.24; 280/47.19
(58) Field of Classification Search .......... 280/47.17, 280/47.19, 47.2, 47.24, 63, 47.27, 47.28, 280/47.33, 79.11, 79.3, DIG. 6
See application file for complete search history.

(56) References Cited

U.S. PATENT DOCUMENTS

| | | | | |
|---|---|---|---|---|
| 1,722,193 | A * | 7/1929 | Brandon | 280/47.24 |
| 2,964,328 | A * | 12/1960 | Muir | 280/47.19 |
| 3,738,677 | A * | 6/1973 | Renock | 280/37 |
| 4,023,818 | A * | 5/1977 | Troller | 280/79.11 |
| 4,176,752 | A * | 12/1979 | Taber | 211/120 |
| 5,393,081 | A * | 2/1995 | Mortenson | 280/47.27 |
| 5,915,646 | A * | 6/1999 | Campbell | 242/594.4 |
| 6,260,865 | B1 * | 7/2001 | Yacobi et al. | 280/47.34 |
| 6,547,085 | B1 * | 4/2003 | Belisle | 211/85.7 |
| 2002/0030336 | A1 * | 3/2002 | Bootsman | 280/47.19 |

FOREIGN PATENT DOCUMENTS

| | | | | |
|---|---|---|---|---|
| AT | 280060 | * | 3/1970 | 280/47.24 |
| FR | 2513957 | * | 4/1983 | |

* cited by examiner

Primary Examiner—Frank Vanaman
(74) Attorney, Agent, or Firm—Alan D. Kamrath; Nikolai & Mersereau, P.A.

(57) ABSTRACT

A cart (10) facilitates collection, storage and distribution of folding warning lines (200). The cart (10) includes a framework (12) with a rolling support (100) to allow mobility and a stabilizer (120) to engage a work surface. The framework (12) has a handlebar (110), which enables the framework (12) to be tilted rotationally about the rolling support (100) and pushed. The framework (12) has a storage area (18) located between first and second sides (14, 16) and for receiving rigid members (201) of the folding warning lines (200). A plurality of notches (70) defined in a top member (32) and a plurality of slots (72) defined in a bottom member (48) of the framework (12) are adapted to receive and constrain the rigid members (201) in the storage area (18). The framework (12) has a holder (78) adapted to hold a flaccid member (202) of the folding warning lines (200). When the framework (12) is in an immobile position, the first and second sides (14, 16) are at a retention angle to gravitationally hold the rigid members (201) in the storage area (18). A retainer (130) constrains the rigid members (201) when the framework (12) is mobile.

20 Claims, 3 Drawing Sheets

CART TO FACILITATE COLLECTION, STORAGE AND DISTRIBUTION OF FOLDING WARNING LINES

BACKGROUND

The present invention generally relates to carts and more particularly to carts to facilitate collection, storage and distribution of folding warning lines.

In a process of roofing, particularly on a flat roof, heavy equipment is transported to and used on a roof. Folding warning lines are arranged around the perimeter of the roof to denote the edge of the roof to protect personnel and equipment from inadvertently approaching the edge of the roof.

The folding warning lines include rigid members that stand upright when in use and fold flat for storage, and a flaccid member, such as a cord, which strings between the rigid members. The rigid members are folded and bundled together with the flaccid member for transport and storage and can easily become disorganized and tangled. Also, as with other roofing equipment, the folding warning lines usually need to be lifted to the roof surface by a crane.

Therefore, there is a need for a novel cart to overcome deficiencies encountered in collection, storage and distribution of folding warning lines.

SUMMARY

The present invention solves these needs and other problems in the field of folding warning lines by providing, in a preferred form, a cart to facilitate collection, storage and distribution of folding warning lines. The cart includes a framework having a first side and a second side each terminating in a top, a bottom, a front, and a back. A storage area for the folding warning lines is located between the first side and the second side. The storage area is accessible between the fronts of the first side and the second side. The framework has a top member extending laterally between the tops and has a bottom member extending laterally between the bottoms of the first and second sides. A plurality of notches are defined in the top member, and a plurality of slots are defined in the bottom member. The plurality of slots and the plurality of notches are adapted and cooperate to receive and store rigid members of the folding warning lines. A holder on the framework is adapted to receive, store and release a flaccid member of the folding warning lines. An engagement device on the framework accommodates engagement by a crane to transport the framework and the folding warning lines stored thereon to a work surface. A rolling support is rotatably mounted to the framework and provides mobility on the work surface. The framework has a handlebar, which enables the framework to be tilted rotationally about the rolling support and pushed in a movement direction. The fronts of the first and second sides are located ahead of the backs of the first and second sides in the movement direction. The cart has a stabilizer, which engages the work surface and cooperates with the rolling support to support the framework in an immobile position. In the immobile position, the first and second sides of the framework are inclined toward the backs at a retention angle to hold the rigid members of the folding warning lines in the storage area gravitationally. Lower ends of the rigid members are constrained from movement in frontward, backward, sideward and downward directions by the plurality of slots. The frontward direction is toward the fronts from the backs of the first and second sides and the backward direction is toward the backs from the fronts. The sideward direction is toward the first side from the second side or toward the second side from the first side. The downward direction is toward the bottom member from the top member of the framework. Upper ends of the rigid members of the folding warning lines are constrained from movement in backward and sideward directions by the plurality of notches. The upper ends of the rigid members are gravitationally constrained from movement in the frontward direction by the retention angle of the framework when the framework is in the immobile position. A retainer is adjustable between a retaining position and an open position. The rigid members of the folding warning lines are further constrained from movement in a frontward direction when the retainer is in the retaining position. When the retainer is in the open position, the upper ends of the rigid members are unrestrained in the frontward direction for loading and unloading of the folding warning lines.

It is thus an objective of the present invention to provide a novel cart to facilitate collection, storage and distribution of folding warning lines.

It is yet another objective of the present invention to provide such a novel cart to provide orderly loading and unloading of the folding warning lines.

It is yet another objective of the present invention to provide such a novel cart that can securely retain the folding warning lines while being transported by crane to a work surface.

It is yet another objective of the present invention to provide such a novel cart to receive, store and release both flaccid and rigid members of the folding warning lines without tangling.

These and further objectives of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
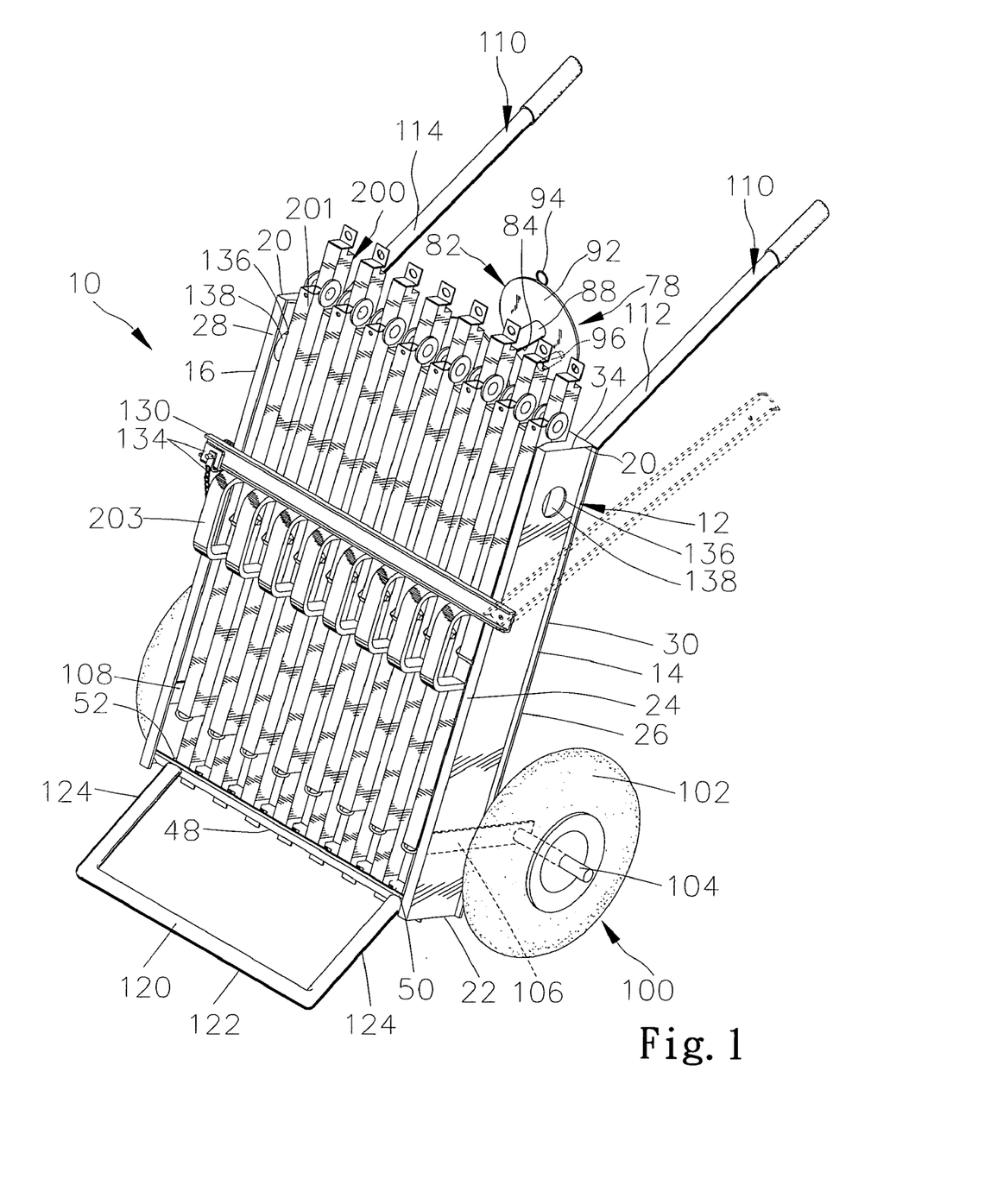
FIG. 1 shows a perspective view of a cart for folding warning lines according to the preferred teachings of the present invention.
Figure 2:
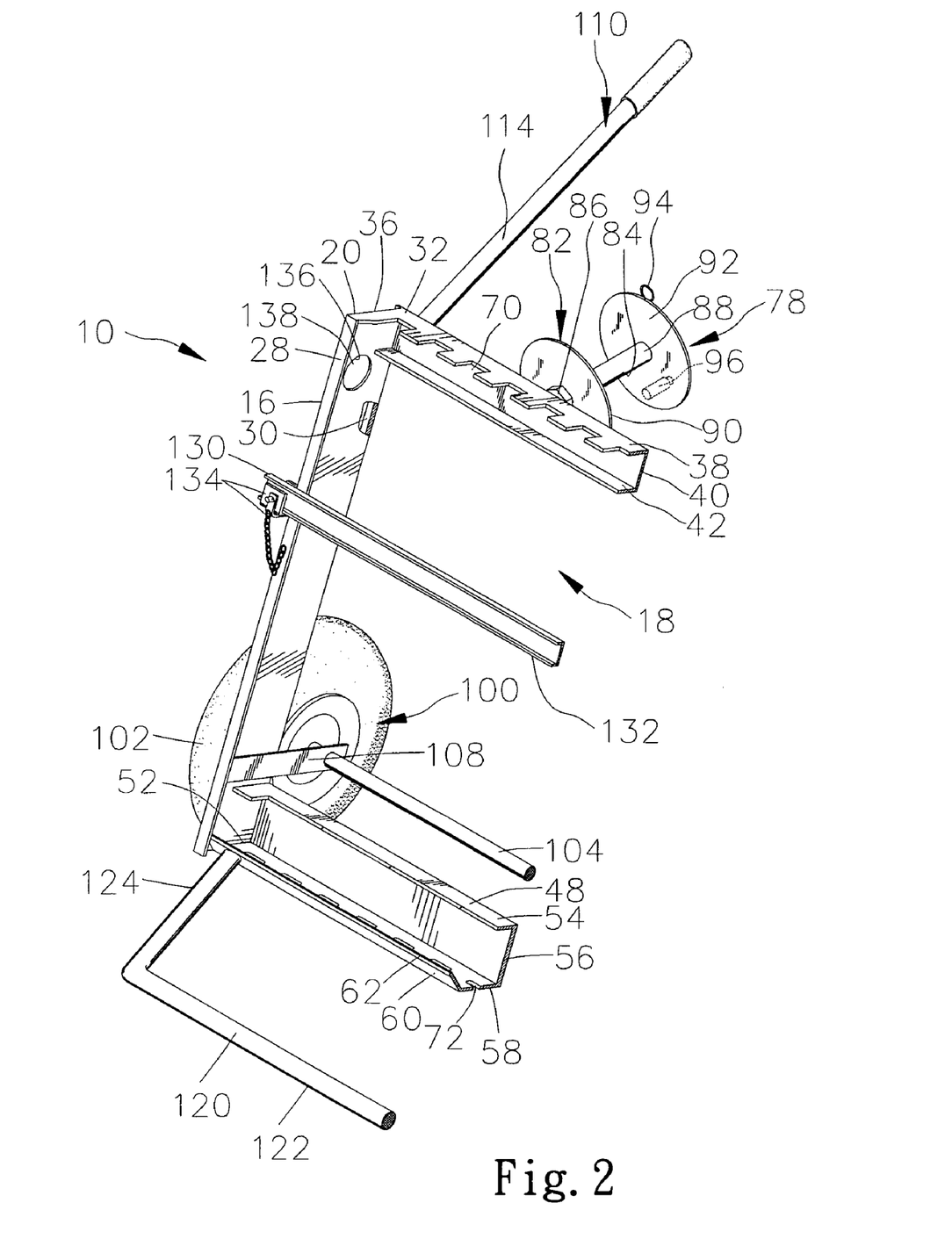
FIG. 2 shows a perspective view of the cart of FIG. 1 with the folding warning lines removed and portions of the cart removed.
Figure 3:
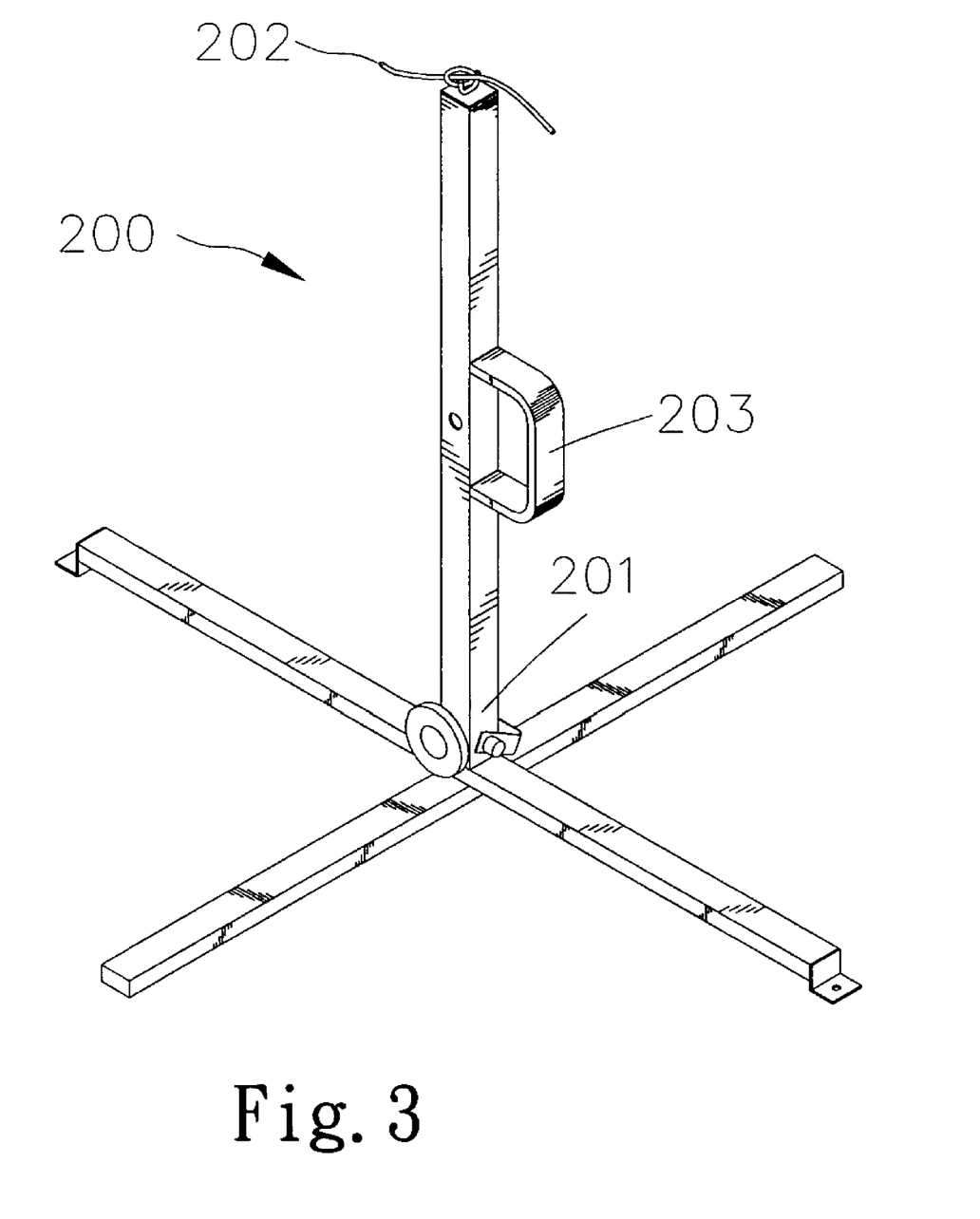
FIG. 3 shows a partial perspective view of a warning line in use.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength and similar requirements will likewise be within the skill of the art after the following description has been read and understood.

Where used in the various figures of the drawings, the same numerals designate the same or similar parts. Furthermore, when the terms "side," "end," "top," "bottom," "front," "back," "up," "down," "first," "second," "laterally," and similar terms are used herein, it should be understood that these terms have reference only to the structure shown in the drawings as it would appear to a person viewing the drawings and are utilized only to facilitate describing the illustrative embodiment.

DESCRIPTION OF THE PREFERRED EMBODIMENT

A cart constructed according to the preferred teachings of the present invention is shown in the drawings and generally designated 10. The cart 10 includes a framework 12 having a first side 14 and a second side 16. Each of the first and second sides 14 and 16 terminates in a top 20, a bottom 22, a front 24 and a back 26. A storage area 18 for folding warning lines 200 is located between the first side 14 and the second side 16. The storage area 18 is accessible between the fronts 24 of the first side 14 and the second side 16. In the preferred form according to the teachings of the present invention, the framework 12 is formed of metal and the first and second sides 14 and 16 are symmetrical about the storage area 18 and are equal in size.

In the preferred form according to the teachings of the present invention, each front 24 of the first and second sides 14 and 16 terminates in a front flange 28 that extends between the top 20 and the bottom 22 and breaks at a right angle toward the storage area 18. Also, in the preferred form, each back 26 of the first and second sides 14 and 16 terminates in a back flange 30 that is parallel to and spaced from the front flange 28, with the back flange 30 of the first and second sides 14 and 16 extending between the top 20 and the bottom 22 and breaking at a right angle away from the storage area 18.

According to the preferred teachings of the present invention, the framework 12 has a top member 32 extending laterally between the tops 20 of the first and second sides 14 and 16. In the preferred form according to the teachings of the present invention, the top member 32 has a lateral length and a first end 34 and a second end 36 along the lateral length. In the preferred form according to the teachings of the present invention, the top member 32 includes a top plate 38, a back plate 40 and a bottom plate 42. In the preferred form, the top plate 38 and the bottom plate 42 are parallel to each other and the back plate 40 is perpendicular to the top and bottom plates 38 and 42 to form C shaped cross sections of the top member 32. The top plate 38 is attached to the tops 20 of the first and second sides 14 and 16, with the top plate 38 at the first end 34 being attached to the first side 14 and at the second end 36 being attached to the second side 16. The back plate 40 is attached to the backs 26 of the first and second sides 14 and 16, with the back plate 40 at the first end 34 being attached to the first side 14 and at the second end 36 being attached to the second side 16.

According to the preferred teachings of the present invention, the framework 12 also has a bottom member 48 extending laterally between the bottoms 22 of the first and second sides 14 and 16. In the preferred form according to the teachings of the present invention, the bottom member 48 has a length and a first edge 50 and a second edge 52 along the length. In the preferred form, the bottom member 48 has a top portion 54, a back portion 56 and a bottom portion 58. The top portion 54 and the bottom portion 58 are parallel to each other, and the back portion 56 is perpendicular to the top and bottom portions 54 and 58 to form C shaped cross sections of the bottom member 48. The bottom portion 58 is attached to the bottoms 22 of the first and second sides 14 and 16, with the bottom member 48 at the first edge 50 being attached to the first side 14 and at the second edge 52 being attached to the second side 16. The back portion 56 is attached to the backs 26 of the first and second sides 14 and 16, with the back portion 56 at the first edge 50 being attached to the first side 14 and at the second edge 52 being attached to the second side 16. In the preferred form according to the teachings of the present invention, the bottom member 48 also has a front portion 60 that extends along the length and is attached to the bottom portion 58. The front portion 60 is inclined in frontward and upward directions and defines a front edge 62 of the bottom member 48. The frontward direction is toward the fronts 24 from the backs 26 of the first and second sides 14 and 16. The upward direction is toward the tops 20 from the bottoms 22 of the first side 14 and the second side 16.

According to the preferred teachings of the present invention, a plurality of notches 70 are defined in the top member 32, and a plurality of slots 72 are defined in the bottom member 48. Notches 70 and slots 72 are adapted and cooperate to hold rigid members 201 of the folding warning lines 200. In the preferred form according to the teachings of the present invention, the plurality of notches 70 are defined in the top plate 38 of the top member 32, and the plurality of slots 72 are defined in the bottom portion 58 of the bottom member 48. Notches in the plurality of notches 70 are laterally spaced to correspond to lateral spacing of slots in the plurality of slots 72 to provide orderly storage and ease of loading and unloading the folding warning lines 200. In the most preferred form according to the teachings of the present invention, the notches in the plurality of notches 70 and the slots in the plurality of slots 72 each number eight. In further aspects of the present invention, other quantities of notches in the plurality of notches 70 and slots in the plurality of slots 72 may be employed without departing from the spirit or scope of the present invention.

According to the preferred teachings of the present invention, a holder 78 is provided on the framework 12 and adapted to receive, store and release a flaccid member 202 of the folding warning lines 200. In the preferred form according to the teachings of the present invention, the holder 78 is a spool 82. The spool 82 has an axle 84 with an interior end 86 and an opposite end 88. The interior end 86 of the axle 84, in the preferred form, is rotatably mounted to the back plate 40 of the top member 32 between the first and second ends 34 and 36. The axle 84 is generally perpendicular to the back plate 40. In the preferred form according to the teachings of the present invention, the spool 82 includes a first flange 90 attached to the interior end 86 of the axle 84 and a second flange 92 attached to the opposite end 88 of the axle 84 to contain the flaccid member 202. In the preferred form according to the teachings of the present invention, a ring 94 is attached to the second flange 92 exterior to the spool 82. The ring 94 is adapted to affix the flaccid member 202 of the folding warning lines 200 to the spool 82. In the preferred form according to the teachings of the present invention, a grip 96 is mounted on the second flange 92 exterior to the spool 82 to facilitate turning of the spool 82. The ring 94 and the grip 96 cooperate to facilitate tangle free winding of the flaccid member 202 onto the spool 82.

According to the preferred teachings of the present invention, a rolling support 100 is rotatably mounted to the framework 12 to provide mobility on a work surface, such as a roof surface. In the preferred form according to the teachings of the present invention, the rolling support 100 includes wheels 102 rotatably mounted to opposite ends of an axle 104. The axle 104 of the rolling support 100 is parallel and spaced from the bottom member 48 of the framework 12 and is mounted on a first bar 106 and a second bar 108 in the preferred form. The first bar 106 is attached to the first side 14 of the framework 12 intermediate the top and bottom members 32 and 48 and proximate the bottom 22 of the first side 14. The second bar 108 is attached to the second side 16 of the framework 12 intermediate the top and bottom members 32 and 48 and proximate the bottom 22 of the second side 16. The wheels 102, in the preferred form according to the teachings of the present invention, are external to the first bar 106 and the second bar 108 along a length of the axle 104. As will be recognized by those skilled in the art, alternate rolling supports 100, including but not limited to a single roller, casters or the like, may be used without departing from the spirit or scope of the present invention.

According to the teachings of the present invention, a handlebar 110 is provided on the framework 12. The handlebar 110 enables the framework 12 to be tilted rotationally about the rolling support 100 and pushed in a movement direction, with the fronts 24 of the first and second sides 14 and 16 being ahead of the backs 26 of the first and second sides 14 and 16 in the movement direction. In the preferred form according to the teachings of the present invention, the handlebar 110 includes a first handle 112 and a second handle 114 which are linearly straight and formed of tubular stock and attached to the back plate 40 of the top member 32. The first handle 112 is attached near the first end 34 and the second handle 114 is attached near the second end 36 of the back plate 40. In the preferred form, the first handle 112 and the second handle 114 incline at an angle in the order of 135° from the backs 26 in the upward direction exterior to the framework 12.

A stabilizer 120 is provided to engage the work surface when the framework 12 is in an immobile position according to the preferred teachings of the present invention. The stabilizer 120 cooperates with the rolling support 100 to support the framework 12 in the immobile position. In the immobile position, the first and second sides 14 and 16 of the framework 12 are inclined toward the backs 26 at a retention angle. In the preferred form according to the teachings of the present invention, the stabilizer 120 is formed of tubular stock and has an inverted U shape that includes a spine 122 with opposite ends and a leg 124 on each end of the spine 122. The legs 124 are attached to the front portion 60 of the bottom member 48 of the framework 12 near the first and second edges 50 and 52. The stabilizer 120 is attached at a downwardly inclining angle and is exterior the framework 12. The spine 22 engages the work surface to hold the framework 12 at the retention angle in the immobile position. In the most preferred form according to the teachings of the present invention, the retention angle in the order of 20 degrees from a normal to the work surface.

When the framework 12 is at the retention angle, the rigid members 201 of the folding warning lines 200 are gravitationally retained in the storage area 18. The plurality of slots 72 is adapted to constrain lower ends of the rigid members 201 from movement in frontward, backward, sideward and downward directions. The backward direction toward the backs 26 from the fronts 24 of the first and second sides 14 and 16. The sideward direction is toward the first side 14 from the second side 16, or toward the second side 16 from the first side 14. The downward direction is toward the bottom member 48 from the top member 32 of the framework 12. The plurality of notches 70 is adapted to constrain upper ends of the rigid members 201 from movement in the backward and sideward directions. The retention angle gravitationally constrains the upper ends of the rigid members 201 from movement in the frontward direction when the framework 12 is in the immobile position.

According to the preferred teachings of the present invention, a retainer 130 is provided and in the preferred form is attached to the front 24 of the first side 14 between the top 20 and the bottom 22. The retainer 130 is adjustable between a retaining position and an open position. In the retaining position, the retainer 130 constrains the rigid members 201 of the folding warning lines 200 from movement in the frontward direction. In the open position, the retainer 130 leaves the upper ends of the rigid members 201 unrestrained in the frontward direction to facilitate loading and unloading of the folding warning lines 200. In the preferred form, the retainer 130 extends between the fronts 24 of the first and second sides 14 and 16 and is attached to the front 24 of the second side 16 in the retaining position and is adapted to cooperate with a protruding part 203 of the rigid members 201 to limit movement of the rigid members 201 in the upward direction. In the preferred form, the protruding part 203 of the rigid members 201 is shown as a carrying handle. However, the retainer 130 could be adapted to cooperate with another protruding part 203 such as, but not limited to, an eyebolt, hook, or the like, according to the teachings of the present invention.

In the preferred form according to the teachings of the present invention, the retainer 130 is formed by a bar 132 that is pivotably attached to the front 24 of the first side 14 about an axis intermediate and parallel to the top 20 and bottom 22 of the first side 14 and perpendicular to the top member 32. The bar 132 is removably and replaceably attached to the front 24 of the second side 16 between the top 20 and the bottom 22 and is lockable to the second side 16. In the most preferred form according to the teachings of the present invention, the bar 132 is a U shaped channel with a back of the U shaped channel adjacent the front 24 of the first side 14. In the most preferred form, the back of the U shaped channel is lockable to the front 24 of the second side 16 by a clevis and pin 134 in the retaining position. When the bar 132 is pivoted to an open position, the bar 132 is generally parallel and adjacent to the first side 14 to provide access to the storage area 18 to facilitate loading and unloading of the folding warning lines 200.

According to the preferred teachings of the present invention, the framework 12 has an engagement device 136 to accommodate engagement by a crane to transport the framework 12 and the folding warning lines 200 stored thereon to the work surface. In the preferred form according to the teachings of the present invention, a circular cutout 138 in the first and second sides 14 and 16 and near the tops 20 of the first and second sides 14 and 16 forms the engagement device 136. As would be obvious to one skilled in the art, alternate engagement devices such as, but not limited to, eyebolts or the like, could be employed without departing from the spirit or scope of the present invention.

Now that the basic teachings of the present invention have been explained, many extensions and variations will be obvious to one having ordinary skill in the art. For example, although the cart 10 according to the preferred teachings of the present invention has been shown as including several features in combination believed to produce synergistic results, such features can be utilized singly and in other combinations with other features according to the teachings of the present invention. For example, although according to the teachings of the present invention, the framework 12 with the first and second sides 14 and 16 being parallel and symmetrical about the storage area 18 along with the plurality of notches 70 being defined in the top plate 38 of the top member 32 and the plurality of slots 72 being defined in the bottom portion 58 of the bottom member 48, in combination, provides ease of collecting, storing and distributing the rigid members 201 of the folding warning lines 200, the first and second sides 14 and 16 may be of different forms, sizes, shapes and orientations than shown and to each other or the plurality of notches 70 and the plurality of slots 72 could be located in different parts of the top and bottom members 32 and 48 to accommodate the folding warning lines 200 according to the teachings of the present invention.

Additionally, in the preferred form according to the teachings of the present invention, the slots in the plurality of slots 72 are shown as oblong cutouts. As would be recognized by those skilled in the art, other configuration of the slots of the plurality of slots 72, such as but not limited to cup-shaped receivers, depressions in the bottom member 48 or like members which slideably receive a portion and especially an end of the rigid member 201 and especially when received and removed by vertical movement, could be utilized according to the teachings of the present invention. Similarly, the notches in the plurality of notches 70 are shown in the preferred form as being cut out of the top plate 38 of the top member 32. Other configurations of the notches in the plurality of notches 70, such as, but not limited to, a hook in the bottom plate 42, pins extending from the top member 32, or like members which slideably receive a portion of the rigid member 201 and especially when received or removed by horizontal movement could be utilized without departing from the spirit or scope of the present invention.

Furthermore, although the framework 12 in the most preferred form is formed of metal which is believed to be advantageous for many reasons including being inexpensive to purchase, manufacture, and assemble, strong, and aesthetically pleasing, framework 12 could be formed from other material, such as but not limited to, a rigid plastic, according to the teachings of the present invention.

Similarly, as will be recognized by those skilled in the art, alternate holders 78 for the flaccid member 202, including but not limited to a cleat on which to wrap the flaccid member 202 or wrapping of the flaccid member 202 around the handlebar 110, could be used according to the teachings of the present invention.

Additionally, although the handlebar 110 of the preferred form having a first handle 112 and a second handle 114 is advantageous and is believed to produce synergistic results with the rolling support 100 of the most preferred form, the handlebar 110 according to the teachings of the present invention could be of different forms, shapes, and orientations, and could be at other locations on the framework 12.

Thus since the invention disclosed herein may be embodied in other specific forms without departing from the spirit of general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning, and ranges of equivalency of the claims are intended to be embraced therein.

The invention claimed is:

1. Cart to facilitate collection, storage and distribution of folding warning lines, with the folding warning lines including rigid members and a flaccid member, with the cart comprising, in combination:

a framework having a first side and a second side, with each of the first side and the second side terminating in a top, a bottom, a front, and a back, with a storage area for the folding warning lines located between the first side and the second side, with the storage area being accessible between the fronts of the first side and the second side, with the framework having a top member extending laterally between the tops of the first side and the second side, with the framework having a bottom member extending laterally between the bottoms of the first and second sides, with the bottom member defining a plurality of slots, with the top member defining a plurality of notches, with the plurality of slots and the plurality of notches adapted and cooperating to receive and retain the rigid members of the folding warning lines to facilitate orderly storage of the rigid members of the folding warning line;

a holder on the framework, with the holder being adapted to receive, store and release the flaccid member of the folding warning lines without tangling;

an engagement device on the framework to accommodate engagement by a crane to transport the framework and the folding warning lines stored thereon to a work surface;

a rolling support rotatably mounted to the framework, with the rolling support providing mobility on the work surface;

a handlebar on the framework, with the handlebar enabling the framework to be tilted rotationally about the rolling support and pushed in a movement direction, with the fronts of the first side and the second side located ahead of the backs of the first side and the second side in the movement direction;

a stabilizer, with the stabilizer engaging the work surface when the framework is in an immobile position, with the stabilizer cooperating with the rolling support to support the framework in the immobile position, wherein when the framework is in the immobile position the first side and the second side of the framework are inclined toward the backs at a retention angle, wherein when the first and second sides are at the retention angle, the rigid members of the folding warning lines are gravitationally retained in the storage area, with the plurality of slots adapted to constrain lower ends of the rigid members in frontward, backward, sideward and downward directions, with the frontward direction being towards the fronts from the backs of the first and second sides, with the backward direction being toward the backs from the fronts of the first and second sides, with the sideward direction being toward the first side from the second side or toward the second side from the first side, with the downward direction being toward the bottom member from the top member of the framework, with the phirality of notches adapted to constrain upper ends of the rigid members in the backward and sideward directions, with the retention angle gravitationally constraining the upper ends of the rigid members from movement in the frontward direction when the framework is in the immobile position; and a retainer adjustable between a retaining position and an open position, with the retainer constraining the rigid members of the folding warning lines from movement in the frontward direction when the retainer is in the retaining position, with the retainer in the open position leaving the upper ends of the rigid members unrestrained in the frontward direction to facilitate loading and unloading of the folding warning lines.

2. The cart of claim 1 with the first and second sides being parallel, equal in size, and symmetrical about the storage area, with the fronts of the first and second sides terminating in a front flange that extends between the top and the bottom and breaks at a right angle toward the storage area, with the backs of the first and second sides terminating in a back flange that is parallel and spaced from the front flange, with the back flange of the first and second sides extending between the top and the bottom and breaking at a right angle away from the storage area.

3. The cart of claim 1 with the engagement device being a circular cutout on each of the first and second sides proximate the tops, with the circular cutout adapted to accommodate connection by a crane.

4. The cart of claim 1 with the retention angle being approximately 20 degrees, from a normal to the work surface.

5. The cart of claim 1 with the rolling support comprising wheels rotatably mounted to opposite ends of an axle, with the axle being parallel and spaced from the bottom member and having a length, with the axle mounted on a first bar and a second bar, with the wheels being external to the first bar and the second bar along the length of the axle, with the first bar being attached to the first side intermediate the bottom member and the top member and proximate the bottom of the first side, and the second bar being attached to the second side intermediate the bottom member and the top member and proximate the bottom of the second side.

6. The cart of claim 1 with the retainer in the retaining position cooperating with a protruding part of the rigid members to limit movement of the rigid members in an upward direction, with the upward direction being toward the top member from the bottom member of the framework.

7. The cart of claim 6 with the retainer formed by a bar pivotably attached to the front of the first side about an axis intermediate and parallel to the top and bottom of the first side and perpendicular to the top member, with the bar being removably and replaceably attached to the front of the second side intermediate the top and the bottom, with the bar being lockable to the front of the second side, with the retainer being in the retaining position when the bar is locked to the second side, with pivoting of the bar moving the retainer to an open position, with the bar in the open position being generally parallel and adjacent the first side to provide access to the storage area to facilitate loading and unloading of the folding warning lines.

8. The cart of claim 7 with the bar being a U shaped channel lockable to the front of the second side with a clevis and pin, with a back of the U shaped channel being adjacent the fronts of the first and second sides in the retaining position.

9. The cart of claim 1 with the top member having a lateral length and a first end and a second end along the lateral length, with the top member including a top plate, a back plate and a bottom plate, with the top plate and the bottom plate being parallel and the back plate being perpendicular to the top plate and the bottom plate, with the top plate, the back plate, and the bottom plate cooperating to define C shaped cross sections of the top member, with the top plate at the first end attached to the top of the first side, with the top plate at the second end attached to the top of the second side, with the back plate at the first end attached to the back of the first side, with the back plate at the second end attached to the back of the second side.

10. The cart of claim 9 with the holder comprising a spool having an axle, with the axle having an interior end and an opposite end, with the interior end of the axle rotatably mounted to the back plate of the top member intermediate the first end and the second end, with the axle being generally perpendicular to the back plate, with the spool having a first flange and a second flange, with the first flange being on the interior end and the second flange being on the opposite end of the axle to contain the flaccid member of the folding warning lines intermediate the first and second flanges, with a grip attached to the second flange exterior to the spool to facilitate turning of the spool, with a ring attached to the second flange exterior to the spool and adapted to affix the flaccid member of the folding warning lines to the spool to facilitate tangle free winding onto the spool.

11. The cart of claim 9 with the handlebar comprising a first handle attached to the back plate of the top member proximate the first end and a second handle attached to the back plate of the top member proximate the second end, with the first handle and the second handle inclining in an upward direction exterior to the framework.

12. The cart of claim 11 with the bottom member having a length and a first edge and a second edge along the length, with the bottom member having a top portion, a back portion, and a bottom portion, with the top portion and the bottom portion being perpendicular to the back portion and parallel to the top plate of the top member, with the top portion cooperating with the back portion and the bottom portion to form C shaped cross sections of the bottom member, with the bottom portion at the first edge attached to the bottom of the first side and the bottom portion at the second edge attached to the bottom of the second side, with the back portion at the first edge attached to the back of the first side and the back portion at the second edge attached to the back of the second side, with the bottom member further including a front portion, with the front portion extending along the length and attached to the bottom portion of the bottom member, with the front portion protruding toward the fronts of the first and second sides, with the front portion being upwardly inclined from the bottom portion, with the bottom member terminating at a front edge defined by the front portion.

13. The cart of claim 12 with the stabilizer having an inverted U shape, with the inverted U shape including a spine with opposite ends and a leg on each end of the spine, with the legs being attached to the front portion of the bottom member of the framework proximate the first edge and the second edge of the bottom member, with the stabilizer, being attached at a downwardly inclining angle and extending exterior the framework, with the spine engaging the work surface when the framework is in the immobile position.

14. The cart of claim 12 with the plurality of notches being defined in the top plate of the top member and with the plurality of slots being defined in the bottom portion of the bottom member, with notches of the plurality of notches being laterally spaced according to lateral spacing of slots of the plurality of slots to facilitate order and ease of loading and unloading the rigid members of the folding warning lines.

15. The cart of claim 14 with the notches in the plurality of notches numbering eight and the slots in the plurality of slots numbering eight.

16. The cart of claim 15 with the framework being metal.

17. The cart of claim 9 with the bottom member having a length and a first edge and a second edge along the length, with the bottom member having a top portion, a back portion, and a bottom portion, with the top portion and the bottom portion being perpendicular to the back portion and parallel to the top plate of the top member, with the top portion cooperating with the back portion and the bottom portion to form C shaped cross sections of the bottom member, with the bottom portion at the first edge attached to the bottom of the first side and the bottom portion at the second edge attached to the bottom of the second side, with the back portion at the first edge attached to the back of the first side and the back portion at the second edge attached to the back of the second side, with the bottom member further including a front portion, with the front portion extending along the length and attached to the bottom portion of the bottom member, with the front portion protruding toward the fronts of the first and second sides, with the front portion being upwardly inclined from the bottom portion, with the bottom member terminating at a front edge defined by the front portion.

18. The cart of claim 17 with the plurality of notches being defined in the top plate of the top member and with the plurality of slots being defined in the bottom portion of the bottom member, with notches of the plurality of notches being laterally spaced according to lateral spacing of slots of the plurality of slots to facilitate order and ease of loading and unloading the rigid members of the folding warning lines.

19. The cart of claim 18 with the first and second sides being parallel, equal in size, and symmetrical about the storage area, with the fronts of the first and second sides terminating in a front flange that extends between the top and the bottom and breaks at a right angle toward the storage area, with the backs of the first and second sides terminating in a back flange that is parallel and spaced from the front flange, with the back flange of the first and second sides extending between the top and the bottom and breaking at a right angle away from the storage area, with the engagement device being a circular cutout on each of the first and second sides proximate the tops, with the circular cutout adapted to accommodate connection by a crane, with the retention angle being approximately 20 degrees from a normal to the work surface, and with the rolling support comprising wheels rotatably mounted to opposite ends of an axle, with the axle being parallel and spaced from the bottom member and having a length, with the axle mounted on a first bar and a second bar, with the wheels being external to the first bar and the second bar along the length of the axle, with the first bar being attached to the first side intermediate the bottom member and the top member and proximate the bottom of the first side, and the second bar being attached to the second side intermediate the bottom member and the top member and proximate the bottom of the second side.

20. The cart of claim 19 with the holder comprising a spool having an axle, with the axle having an interior end and an opposite end, with the interior end of the axle rotatably mounted to the back plate of the top member intermediate the first end and the second end, with the axle being generally perpendicular to the back plate, with the spool having a first flange and a second flange, with the first flange being on the interior end and the second flange being on the opposite end of the axle to contain the flaccid member of the folding warning lines intermediate the first and second flanges, with a grip attached to the second flange exterior to the spool to facilitate turning of the spool, with a ring attached to the second flange exterior to the spool and adapted to affix the flaccid member of the folding warning lines to the spool to facilitate tangle free winding onto the spool, and with the handlebar comprising a first handle attached to the back plate of the top member proximate the first end and a second handle attached to the back plate of the top member proximate the second end, with the first handle and the second handle inclining in an upward direction exterior to the framework.

\* \* \* \* \*

UNITED STATES PATENT AND TRADEMARK OFFICE
CERTIFICATE OF CORRECTION

| | |
|---|---|
| PATENT NO. | : 7,040,636 B2 |
| APPLICATION NO. | : 10/714280 |
| DATED | : May 9, 2006 |
| INVENTOR(S) | : Richard B. Stoffels |

It is certified that error appears in the above-identified patent and that said Letters Patent is hereby corrected as shown below:

Column 8, line 51, please delete "phirality" and substitute therefor --plurality--.

Signed and Sealed this

Eighteenth Day of July, 2006

JON W. DUDAS
*Director of the United States Patent and Trademark Office*